(12) United States Patent
Ostani

(10) Patent No.: US 9,132,586 B2
(45) Date of Patent: Sep. 15, 2015

(54) PROCESS AND DEVICE FOR MANUFACTURING GLOVES AND THE LIKE

(75) Inventor: Maurizio Ostani, Montebelluna (IT)

(73) Assignee: OutDry Technologies, Inc., Portland, OR (US)

( * ) Notice: Subject to any disclaimer, the term of this patent is extended or adjusted under 35 U.S.C. 154(b) by 867 days.

(21) Appl. No.: 12/439,905

(22) PCT Filed: Sep. 4, 2007

(86) PCT No.: PCT/EP2007/059249
§ 371 (c)(1),
(2), (4) Date: Mar. 5, 2009

(87) PCT Pub. No.: WO2008/028913
PCT Pub. Date: Mar. 13, 2008

(65) Prior Publication Data
US 2010/0018636 A1    Jan. 28, 2010

(30) Foreign Application Priority Data

Sep. 6, 2006    (IT) .............................. MI2006A1700

(51) Int. Cl.
| | |
|---|---|
| *B29C 65/00* | (2006.01) |
| *B29C 49/22* | (2006.01) |
| *B29C 49/24* | (2006.01) |
| *A41D 19/04* | (2006.01) |

(52) U.S. Cl.
CPC ............ *B29C 66/8266* (2013.01); *A41D 19/04* (2013.01); *B29C 49/22* (2013.01); *B29C 49/24* (2013.01)

(58) Field of Classification Search
CPC .... B29C 66/8266; B29C 49/22; B29C 49/24; B29C 49/2408; B29C 49/0047; B29C 49/4278; A41D 19/04

USPC ...................... 156/285, 286; 2/158, 159, 164; 264/511–513, 521, 454, 458, 459, 545, 264/546, 552, 572
See application file for complete search history.

(56) References Cited

U.S. PATENT DOCUMENTS

| | | |
|---|---|---|
| 1,939,852 A | 12/1933 | Howard et al. |
| 2,583,728 A * | 1/1952 | Crowley ....................... 156/212 |
| 4,010,877 A | 3/1977 | Hayes et al. |

(Continued)

FOREIGN PATENT DOCUMENTS

| | | |
|---|---|---|
| JP | 2007155682 A | 6/1995 |
| JP | 08-109504 | 4/1996 |

(Continued)

OTHER PUBLICATIONS

Chinese Office Action for Chinese Application No. 200780033044.2 filed on Mar. 6, 2009.

*Primary Examiner* — Christopher Schatz
(74) *Attorney, Agent, or Firm* — Schwabe, Williamson & Wyatt, P.C.

(57) ABSTRACT

Process for manufacturing gloves (2) and the like, which comprises the following operating steps: —inserting a lining (3) into a glove (2), wherein glue is arranged between the glove (2) and the lining (3); —inserting a plug (1) in the zone of the wrist of the glove (2) provided with the lining (3); —pumping a fluid into the lining (3) for pressing it from the inside against the inner surface of the glove (2). The present invention also relates to a device which carries out said process, as well as gloves or the like obtained with this process or device.

5 Claims, 3 Drawing Sheets

(56) References Cited

U.S. PATENT DOCUMENTS

| | | | |
|---|---|---|---|
| 4,776,209 A | | 10/1988 | Patchel |
| 4,931,115 A | * | 6/1990 | Pajunen ........................ 156/73.1 |
| 6,171,431 B1 | * | 1/2001 | Gallagher et al. ............ 156/251 |
| 6,539,552 B1 | * | 4/2003 | Yoshida ......................... 2/161.6 |
| 2004/0098786 A1 | * | 5/2004 | Hottner et al. .................... 2/159 |
| 2006/0068140 A1 | | 3/2006 | Flather et al. |

FOREIGN PATENT DOCUMENTS

| | | |
|---|---|---|
| WO | 0156415 | 8/2001 |
| WO | 0156415 A | 8/2001 |
| WO | 2006/039131 A1 | 4/2006 |

\* cited by examiner

PROCESS AND DEVICE FOR MANUFACTURING GLOVES AND THE LIKE

The present invention relates to a process for manufacturing gloves and the like, for example mittens. The present invention also relates to a device which carries out said process, as well as gloves or the like obtained with this process or device.

WO 01/56415 discloses two rigid lasts for manufacturing gloves, wherein the first last is similar to a hand with the thumb only and the second last is similar to a hand with the remaining four fingers. A lining, for example a waterproofing sheath provided with a semipermeable membrane, and then a glove are tightly fitted first onto the first last and then onto the second last. In these two consecutive steps the lining is stretched until it assumes the conformation of the lasts so as to adapt to the glove when the latter is fitted onto the lasts. The lasts are internally heated for activating a layer of a thermoactivable adhesive arranged on the outer surface of the lining, after which they pump air into the lining for joining it to the glove, cooling the glue and facilitating its extraction.

This known manufacturing process is relatively difficult and slow to be carried out, since it requires the forced insertion of the lining and then of the glove on two separate lasts, which is not easy especially with the second last and with relatively rigid three-dimensional gloves made of leather. Furthermore, two relatively complex metal lasts must be made for each size of glove to be manufactured, so as to noticeably increase the manufacturing costs.

It is therefore an object of the present invention to provide a process and a device which are free from said disadvantages. Said object is achieved with a process and a device, whose main features are described in claims 1 and 23, respectively, while other features are described in the remaining claims.

Thanks to their particular plug, the process and the device according to the present invention allow to press the lining into the glove without using lasts which are expensive and difficult to be used.

For decreasing the manufacturing times, the fluid pumped into the lining is a hot gas and is preferably directed toward the fingers of the glove by means of particular extensions, so as to improve and speed up the joining between lining and glove in the critical zone of the fingertips.

The glove is preferably inserted in a rigid shell for avoiding its expansion when the fluid is pumped into the lining.

According to a particular aspect of the invention, the rigid shell is made up of two particular half-shells and/or is provided with heaters for improving and speeding up the joining between lining and glove.

According to a particular aspect of the invention, it has been found that particular three-dimensional, breathable, elastomeric gloves made of a single piece, as described in WO 2004/060179, can be advantageously employed as waterproofing sheaths in the process according to the present invention for waterproofing gloves made of leather and/or fabric.

A further advantage of the process and the device according to the present invention lies not only in their greater productivity with respect to the known processes, but also in their relatively low production costs, so that they can be employed not only in the industrial production, but also in the handicraft production.

In an embodiment, the gloves inflated and provided with the plug are inserted into a oven for activating a thermoactivable glue sprayed between the lining and the glove.

Further advantages and features of the process and the device according to the present invention will become clear to those skilled in the art from the following detailed and non-limiting description of three embodiments thereof with reference to the attached drawings, wherein.

Figure 1:
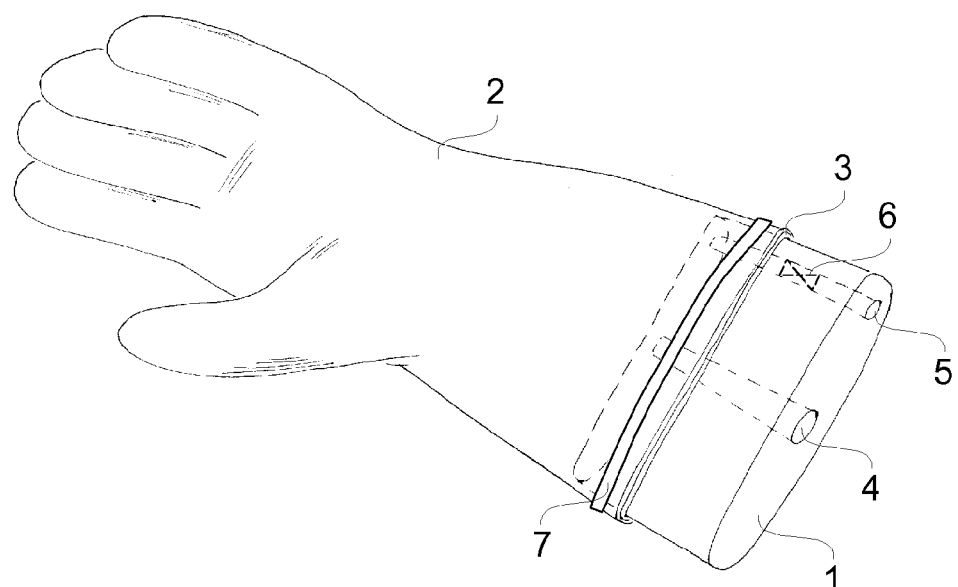
FIG. 1 shows the first embodiment of the device applied to a glove.

Referring to FIG. 1, it is seen that the device according to the first embodiment of the invention comprises a substantially cylindrical- or frutstoconical-shaped plug 1, in particular with a substantially elliptical section, suitable for being inserted into the zone of the wrist of a glove 2 provided with a lining 3 which is arranged inside the glove itself. The surface of lining 3 turned toward glove 2 is provided with a layer of a thermoactivable glue. The glue is distributed on the outer surface of lining 3 in a uniform and discontinuous manner, in particular with a pattern made up of polyurethane glue dots having a diameter comprised between 0.1 mm and 2 mm and a density comprised between 10 dots/cm$^2$ and 200 dots/cm$^2$. Lining 3 preferably comprises at least one membrane made of a semipermeable material, i.e. permeable to water vapor and impermeable to water, in particular polyurethane, which has a thickness preferably comprised between 5 μm and 100 μm, is preferably non-porous, i.e. it carries out the passage of water vapor by osmosis, and elastic with a coefficient of elongation higher than 50%, in particular 100%. The surface of the membrane which is not turned toward glove 2 can be fastened to a fabric or a similar material, preferably elastic. Further information about the semipermeable membrane which can be used for lining 3 is contained in WO 00/22948 and WO 02/11571. Lining 3 can comprise one or more sheets of this semipermeable membrane, which are shaped and mutually joined along the edges. In another embodiment of the invention, lining 3 comprises a particular three-dimensional breathable and elastomeric glove, which is made of a single piece, as disclosed in WO 2004/060179.

Plug 1 is provided with at least one inlet 4 for pumping a fluid, in particular air, into lining 3, so as to press it from the inside against the inner surface of glove 2. Plug 1 is also provided with at least one outlet 5 for discharging the fluid pumped into lining 3. A valve 6 can be arranged along outlet 5 for blocking, reducing or adjusting the flow of the fluid discharged through this duct. A closure device, in particular a collar 7, can be tightened around glove 2 in the zone of the wrist for preventing the passage of fluid between lining 3 and plug 1.

Figure 2:
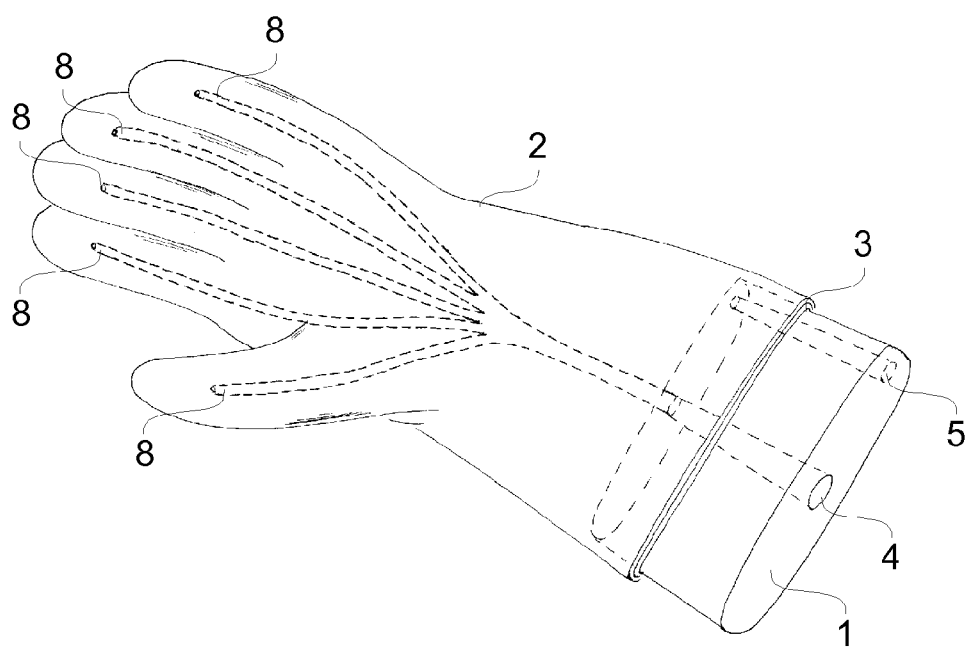
FIG. 2 shows the second embodiment of the device applied to a glove.

Referring to FIG. 2, it is seen that in a second embodiment of the invention one or more extensions suitable for conveying the fluid pumped into lining 3 toward one or more fingers of glove 2 are connected to inlet 4 or outlet 5. In particular, said extensions comprise a series of five semirigid tubes 8 which are connected to inlet 4 and end close to the fingertips of glove 2. The diameter of tubes 8 is preferably shorter than 10 mm.

Figure 3:
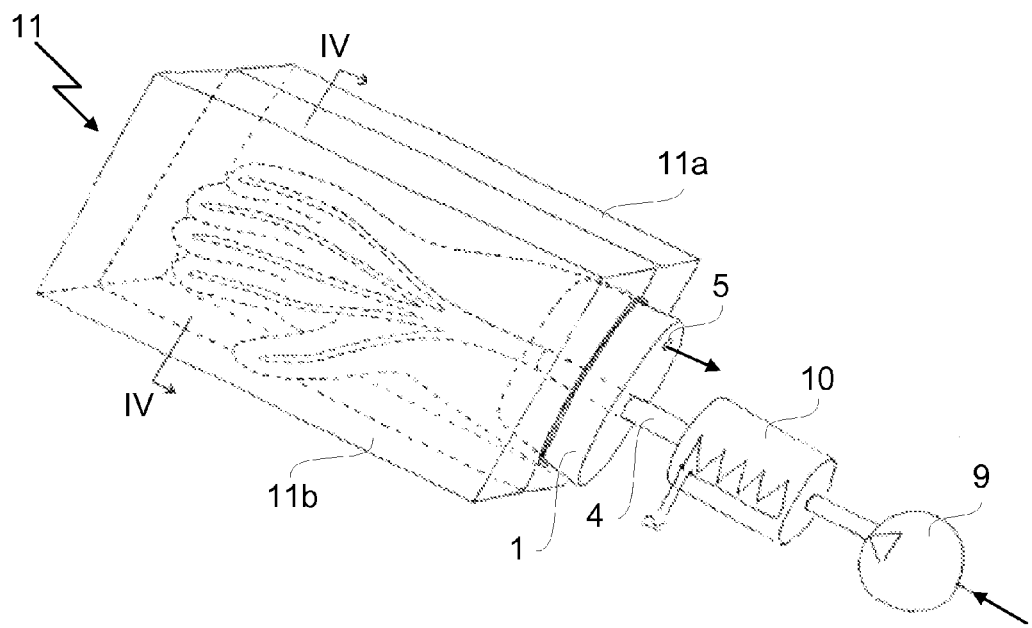
FIG. 3 shows the rigid shell applied to the device of FIG. 2.
Figure 4:
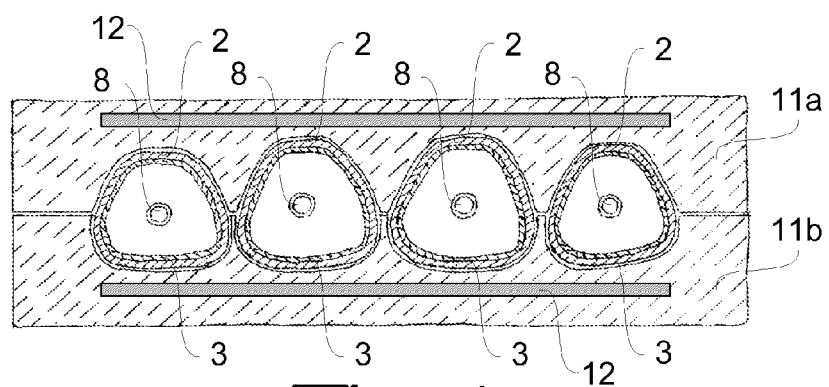
FIG. 4 shows a view sectioned along plane IV-IV of FIG. 3.

Referring to FIGS. 3 and 4, it is seen that the fluid is sucked from the outside and pumped by a pump 9 with an overpressure higher than 5 kPa, in particular comprised between 25 kPa and 35 kPa, after which it is heated at a temperature higher than 100° C. by a heater 10 which is arranged outside plug 1 and is connected to inlet 4. The compressed and heated fluid inflates lining 3 by heating the thermoactivable adhesive, so as to join lining 3 to glove 2. Glove 2 is preferably surrounded by a rigid shell 11 whose inner cavity has a shape substantially complementary to the outer shape of glove 2. Rigid shell 11 comprises two half-shells 11a, 11b divided by a plane which crosses the palm and four fingers, thumb excluded, of glove 2. Rigid shell 11 is made of metal, in particular aluminum, or plastic resistant to a temperature higher than at least 70° C. Rigid shell 11 can also be provided with one or more heaters 12 for heating glove 2 from the outside.

Figure 5:
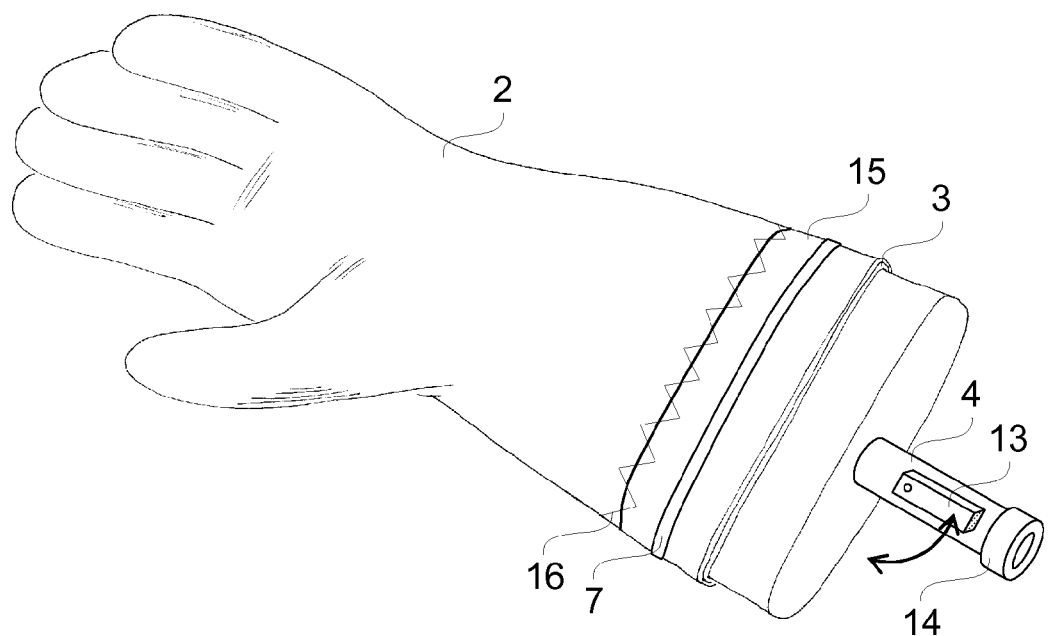
FIG. 5 shows the third embodiment of the device applied to a glove.

Referring to FIG. 5, it is seen that in a third embodiment of the invention plug 1 is not provided with an outlet, while inlet 4 is provided with a valve 13 and a connector 14, so that plug 1 can be separated from pump 9 after valve 13 is closed for keeping the overpressure in lining 3. With this arrangement, a plurality of gloves 2 under pressure can be inserted into an oven at a temperature higher than 80° C., in particular comprised between 100° and 130°. The fluid pumped into lining 3 is preferably nitrogen, so as to reduce its expansion when it is heated by the heating means. Further fluid can be pumped into lining 3 after glove 2 has been extracted from the oven, so as to keep it extended during the cooling.

Before inserting lining 3 into glove 2, the latter is turned inside out and a thermoactivable glue is applied on the fingertips of glove 2. Further glue is sprayed on the rest of the inner surface of glove 2 and/or on the outer surface of lining 3. Glove 2 is turned again, so that its outer surface is turned outwards, and then lining 3 is inserted into glove 2. Before inserting plug 1, the fingertips of glove 2 and of lining 3 are glued by applying a hot plate on the fingertips. After plug 1 is inserted, the air inside glove 2 is sucked and then nitrogen under pressure is pumped. A sleeve 15 can be temporarily fastened to the wrist of glove 2, for example by means of a seam 16, so that collar 7 is applied on sleeve 15 and does not crease glove 2. At the end of the manufacturing process, sleeve 15 is unstitched and the portion of lining 3 protruding from the wrist of glove 2 is cut out.

Further modifications and/or additions may be made by those skilled in the art to the hereinabove disclosed and illustrated embodiments of the invention while remaining within the scope of the following claims. In particular, the process and the device according to the present invention can be employed also for manufacturing mittens or other clothing items similar to the gloves.

The invention claimed is:
1. A process for manufacturing gloves, comprising:
    inserting a lining into a glove, wherein thermoactivable glue is arranged between the glove and the lining and wherein the lining defines a lining opening;
    temporarily stitching a sleeve to a wrist of the glove;
    inserting a plug in the lining opening;
    pumping a fluid into the lining to inflate the lining from the inside against an inner surface of the glove; and
    activating the thermoactivable glue.
2. The process of claim 1, wherein the sleeve is stitched to the wrist of the glove prior to the plug being inserted in the lining opening.
3. The process of claim 1, wherein the fluid pumped into the lining is heated to activate the thermoactivable glue.
4. The process of claim 1, wherein the thermoactivable glue is activated by placing the glove with inflated liner in an oven.
5. The process of claim 4, wherein further fluid is pumped into the lining after the glove has been extracted from the oven.

* * * * *